Nov. 20, 1962     R. OHRNBERGER     3,064,758
SCREW-THREAD DRIVE FOR MACHINE TOOLS
Filed July 24, 1959
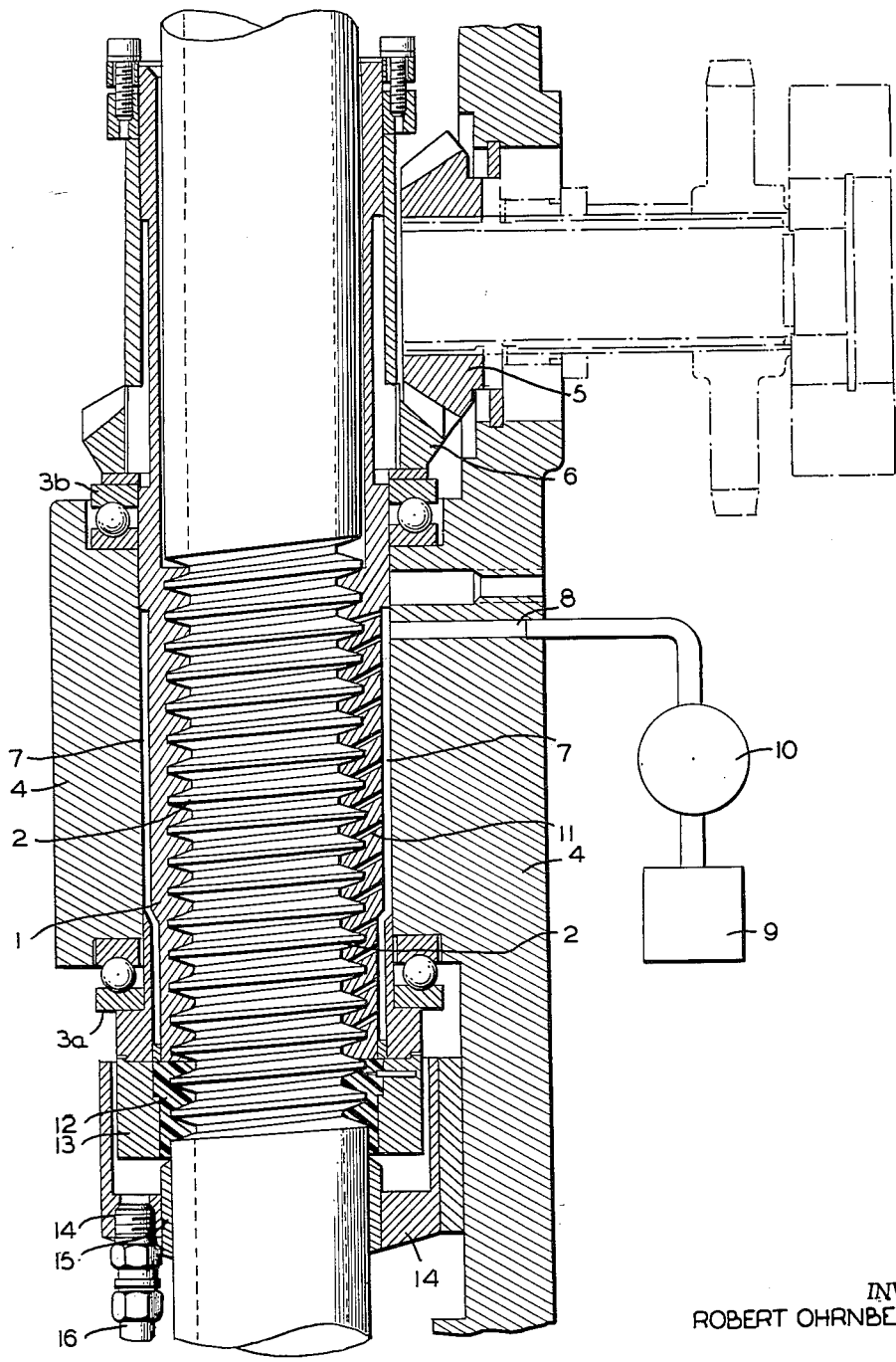
INVENTOR
ROBERT OHRNBERGER
BY *Kenyon, Palmer, Stewart & Estabrook*
ATTORNEYS

3,064,758
SCREW-THREAD DRIVE FOR MACHINE TOOLS
Robert Ohrnberger, Bad Homburg vor der Hohe, Germany, assignor to Vereinigte Werkzeugmaschinenfabriken A.G., Frankfurt am Main, Germany, a corporation of Germany
Filed July 24, 1959, Ser. No. 829,413
Claims priority, application Germany July 26, 1958
1 Claim. (Cl. 184—6)

The invention relates to a screw-thread drive for machine tool mechanisms or parts and is especially useful in boring and milling machines.

The screw-thread drive of machine tool mechanisms, e.g. the vertical drive for the headstocks of boring and milling mechanisms, often has a relatively great length and, because of the manufacturing tolerances of threaded spindle and spindle nut, there may be different distances between the pitch surfaces that move with respect to one another, and corresponding differences in the thickness of the oil film that serves as a lubricant between the movable parts. On the end portions of the nut and the screw-thread spindle portion passing through the nut, in many cases, there is no longer any lubricating film to be carried along so that heavy wear of the parts occurs at such locations.

Furthermore, during the operating procedures when the work piece is being worked upon, the spindle may be subjected to vibration which may originate from the tools fastened to the spindle, such as milling heads, cutting heads and the like, as well as from the components of the machine that are movable, such as motors and gearing, and such vibrations of the spindle may lead to disturbing results.

The present invention proposed to avoid these disadvantages by lubricating the space between spindle nut and the threaded spindle with oil under high pressure, the oil being supplied through narrow openings in the spindle nut located at a number of different points. In this way, even with relatively long screw-threaded drives, there is present a film of lubricant that will be carried along on all relatively movable surfaces, while at the same time damping of the spindle oscillations is obtained. This oscillation damping is obtained from the internal friction of the oil upon vibratory movement of the nut and spindle with respect to one another.

One embodiment of the invention is shown in the drawing by way of example as applied to the spindle rod drive of a boring and milling mechanism, the other well known parts of which are not illustrated. The drawing shows the drive in section along the axis of the spindle, but the spindle is shown in elevation.

In the embodiment shown, a spindle nut 1 has threaded engagement with screw-threaded spindle 2 which is held against rotation but may move axially. The spindle nut 1, which is formed of a relatively long cylindrical sleeve provided with an internal helical thread engaging the thread on spindle 2, is mounted on ball bearing 3a and 3b located at the ends of a bearing box or housing 4 which is formed integrally with the headstock that moves at right angles to it, the details of the head stock not being shown. The bore in bearing box 4 provides a close turning fit with the outer surface of nut 1. The spindle nut is driven from the head stock by way of bevel gear 5 which meshes with gear 6 secured to the nut above bearing 3b. A cylindrical groove is formed in the outer surface of nut 1 to provide an annular chamber or space 7 for lubricating oil which is supplied under pressure through connection 8 from an oil pump 9 by way of a pressure regulator 10. The groove forming space 7 does not extend the full length of the bore in bearing box 4, thus leaving an un-grooved portion of spindle nut 1 in each end of box 4. The oil space 7 is connected through a number of small bores 11 formed in the wall of nut 1 and in locations to supply high-pressure oil to the individual spiral paths of contact between the interengaging threads. In this way a high-pressure oil cushion is formed between all the spiral thread surfaces of spindle 1 and nut 2 which reduces the wear and damps the oscillations of the spindle. It is preferred that at least one bore 11 be provided for each thread turn, but two or more bores may be applied to each turn and being spaced angularly about the axis of the nut. It will be noted that each bore 11 emerges or comes out through a face of the nut thread which has contact with the thread on spindle 1.

The cylindrical groove 7 may be a short groove located at the end of oil connection 8 and oil would be supplied to bores 11 from this short groove through a longitudinal slot or grooved formed in the outer surface of nut 1. Preferably two or more such longitudinal grooves would be provided and equally spaced angularly about the axis of the nut.

The groove or grooves forming the oil space 7 may be formed in the wall of the bore in bearing box 4 instead of in the outer surface of nut 1.

At the lower end of the spindle nut 1 there is provided a ring-shaped piece 12 formed of yieldable or springy material, such as plastic, which has a spiral screw-thread that engages in the screw-thread of the spindle 2. In this way provision is made both for sealing the screw-thread and also for wiping off the leakage oil. The insertion piece 12 is held in position by a guard ring 13 which is fastened to the lower end surface of the spindle nut 1. The leakage oil is collected by a collection cup or box 14 the upper end of which surrounds the ring 13 with considerable clearance. At its lower end cup 14 is provided with a bronze bushing 15 surrounding spindle 2 and extending upwardly from the bottom wall of the cup to provide an annular space in which leakage oil collects. This oil passes over a return connection 16 back into the oil container of pump 9.

It is important that the oil is brought under pressure between the engaging faces of the screw threads of spindle nut 1 and spindle 2 and held under pressure so that for longitudinal impacts on the nut, or on the spindle, a damping of the impacts by means of the oil film present is produced. The oil cannot escape through the narrow apertures between the nut screw thread and the spindle screw thread, that is, it cannot escape as fast as the pressure pulse takes place. The viscosity of the oil supplied is chosen so as to get the desired impulse damping corresponding to the size of bores 11 being used in any particular installation. The size of bores 11 will depend somewhat upon the size of the screw and nut, the thread clearance and other factors which will vary with different installations. By way of example only, the bores 11 may have a diameter of from 1 to 2 millimeters. Also, the pressure of the oil supplied to space 7 will vary somewhat in different installations, but in certain installations a pressure of about 8 atmospheres (about 120 lb./sq. in.) has been found to be satisfactory.

I claim:
A screw thread drive comprising: a bearing box having a generally vertical bore formed therein; a sleeve rotatably mounted in said bore, said sleeve having internal threads and being held against axial displacement; a spindle element within said sleeve, said spindle element having external threads engaging the internal threads on said sleeve and being held against rotation for axial displacement upon rotation of said sleeve; means defining an oil chamber between said sleeve and said bore, said oil chamber extending lengthwise of said sleeve and said bore and extending over a plurality of thread turns, said sleeve having a plurality of small bores formed therein extending from said chamber, at least one to each thread turn, the outlet ends of said small bores opening through a thread face on said sleeve having contact with a thread face on said spindle; means providing an oil seal between said spindle and said sleeve, said last mentioned means including a ring secured to the lower end of said sleeve and having close threaded engagement with the thread faces on said spindle element; an annular cup surrounding said spindle below said sleeve and extending upwardly and surrounding the lower end portion of said sleeve for collecting leakage oil, said cup being supported by said bearing box; and means for supplying oil under pressure to said chamber.

References Cited in the file of this patent

UNITED STATES PATENTS

| | | |
|---|---|---|
| 2,320,353 | Ernst et al. | June 1, 1943 |
| 2,322,269 | Allen | June 22, 1943 |

FOREIGN PATENTS

| | | |
|---|---|---|
| 661,380 | Germany | June 17, 1938 |